US008992010B2

(12) United States Patent
Ho et al.

(10) Patent No.: US 8,992,010 B2
(45) Date of Patent: Mar. 31, 2015

(54) CORNEAL REMODELLING CONTACT LENSES AND METHODS OF TREATING REFRACTIVE ERROR USING CORNEAL REMODELLING

(75) Inventors: Arthur Ho, Sydney (AU); Padmaja Rajagopal Sankaridurg, Sydney (AU); Brien Anthony Holden, Sydney (AU); Percy Fabian Lazon, Sydney (AU); Xiang Chen, Guangzhou (CN); Fabian Conrad, Sydney (AU); Earl Leo Smith, III, Houston, TX (US)

(73) Assignee: Brien Holden Vision Institute, Sydney, New South Wales (AU)

( * ) Notice: Subject to any disclaimer, the term of this patent is extended or adjusted under 35 U.S.C. 154(b) by 2 days.

(21) Appl. No.: 13/581,949

(22) PCT Filed: Mar. 3, 2011

(86) PCT No.: PCT/AU2011/000234
§ 371 (c)(1),
(2), (4) Date: Aug. 30, 2012

(87) PCT Pub. No.: WO2011/106837
PCT Pub. Date: Sep. 9, 2011

(65) Prior Publication Data
US 2012/0320334 A1 Dec. 20, 2012

(30) Foreign Application Priority Data
Mar. 3, 2010 (AU) ................................ 2010900903

(51) Int. Cl.
*G02C 7/04* (2006.01)

(52) U.S. Cl.
CPC ........... *G02C 7/04* (2013.01); *G02C 7/047* (2013.01); *G02C 2202/24* (2013.01)
USPC .............. 351/159.23; 351/159.12; 351/159.79

(58) Field of Classification Search
CPC ........... G02C 7/04; G02C 7/047; G02C 7/049
USPC ........................... 351/159.23, 159.79, 159.12
See application file for complete search history.

(56) References Cited

U.S. PATENT DOCUMENTS

| 4,952,045 A | 8/1990 | Stoyan |
| 2006/0290882 A1 | 12/2006 | Meyers et al. |

(Continued)

FOREIGN PATENT DOCUMENTS

| JP | 2003-102764 | 4/2003 |
| WO | WO 2008/014544 | 2/2008 |

(Continued)

OTHER PUBLICATIONS

Brien Holden Vision Institute, Communication pursuant to Rules 70(2) and 70a(2) EPC, EP 11750084.3, Oct. 29, 2013, 9 pgs.

(Continued)

*Primary Examiner* — Darryl J Collins
(74) *Attorney, Agent, or Firm* — Jones Day

(57) ABSTRACT

Contact lenses are described with a corneal remodelling effect. This corneal remodelling effect is one or both of broad-area corneal remodelling and localised remodelling. The contact lenses may also have a refractive power. The refractive power may vary across the lens and for myopia may have increased power centrally. The increased power may be provided over a lens area that has increased thickness due to localised remodelling.

22 Claims, 5 Drawing Sheets

(56) References Cited

U.S. PATENT DOCUMENTS

2007/0255401 A1 11/2007 Lang
2009/0303434 A1* 12/2009 Tung .............................. 351/161
2010/0036489 A1 2/2010 Lindacher et al.

FOREIGN PATENT DOCUMENTS

WO WO 2009/055638 A1 4/2009
WO WO 2009/149116 A2 12/2009

OTHER PUBLICATIONS

Brien Holden Vision Institute, Patent Examination Report No. 1, AU 2011223499, Nov. 13, 2013, 4 pgs.
Brien Holding Vision Institute, First Office Action, CN 201180012185.2, Sep. 2, 2013, 16 pgs.
Brien Holden Vision Institute, International Search Report and Written Opinion, PCT/AU2011/000234, Jun. 6, 2011, 13 pgs.
Brien Holden Vision Institute, Second Office Action, MX/a/2012/010147, Feb. 2, 2014, 9 pgs.

* cited by examiner

CORNEAL REMODELLING CONTACT LENSES AND METHODS OF TREATING REFRACTIVE ERROR USING CORNEAL REMODELLING

CROSS REFERENCE TO RELATED APPLICATIONS

This Application is a United States National Stage Application filed under 35 U.S.C. §371 of PCT Patent Application Serial No. PCT/AU2011/000234 filed on Mar. 03, 2011, which claims the benefit of and priority to Australian Patent Application No. 2010900903 filed on Mar. 03, 2010, both of which are hereby incorporated by reference in their entireties.

FIELD OF THE INVENTION

The field of the invention is corneal contact lenses and methods of treating refractive error incorporating remodelling of the shape of the cornea of the eye to which the contact lens is applied (sometimes referred to as orthokeratology). Particular embodiments relate to contact lenses for treating myopia and methods of treating myopia. Particular embodiments relate to contact lenses for controlling progression of myopia and methods for controlling the progression of myopia. Particular embodiments of the invention relate to multi-zone contact lenses. Particular embodiments relate to contact lenses for treating hyperopia and methods of treating hyperopia.

BACKGROUND OF THE INVENTION

Many people suffer from either myopia (short-sightedness) or hyperopia (long-sightedness). The prevalence of myopia is increasing, leading to increased attention to the development of solutions to deal with myopia. In addition, for many people, myopia progresses over time, despite correction using some existing methods.

FIG. 1 shows an eye that is normal sighted (i.e. is neither long-sighted nor short-sighted, also called "emmetropic"). FIG. 2 shows a myopic eye viewing a distant object; the focal point of the image is located in front of the retina. This shifted focal point relative to the retina creates blur. Different myopic eyes may have different magnitudes of myopic blur. For example the retina of another eye may be located at the broken lines shown in FIG. 2, this other eye experiencing less myopic blur. Conversely to myopia, a hyperopic eye has a focal point located behind the retina, which also creates blur.

Several techniques have been used to correct myopia and hyperopia. These techniques include prescribing spectacle lenses or contact lenses, surgical implantation of an intraocular lens (e.g. an anterior chamber phakic intraocular lens), surgical reshaping/remodelling of the cornea and temporary reshaping/remodelling of the cornea by hard or soft contact lenses. Corneal remodelling using soft contact lenses is described in International Patent Publication WO 2005/022242 A1, the content of which is incorporated herein in its entirety.

International patent publication WO 2005/055891 A1, the content of which is also incorporated herein in its entirety, describes the use of a contact lens to control the relative curvature of field with an objective of controlling the progression of myopia or hyperopia. The method includes moving image points at the peripheral retina forwards or backwards respectively relative to the retina, while allowing for clear central vision. Corneal remodelling to achieve desired peripheral refraction is described in international patent publication WO 2008/014544 A1, the content of which is also incorporated herein in its entirety.

When looking at near objects, it has been observed that many individuals with myopia accommodate less than the amount that is needed to bring the image forward onto the retina. This under-accommodation is often referred to as lag of accommodation (or "accommodative lag"). FIG. 3 shows a myopic eye with lag of accommodation; the focal point of the image is located behind the retina. In a study involving children of primarily European descent, lag of accommodation measured at 33 centimetres using an autorefractor found the median lag to be 1.26D (range from −0.75 to 2.82D) in children aged 8 to 11 yrs. In children of Chinese ethnicity, lag of accommodation measured at 33 centimetres was 0.74+/− 0.27D. Attempts have been made to treat accommodative lag. For example, United States patent publication number US 20040237971 A1 describes the control of the optical aberrations to reposition medium and high spatial frequency peaks to alter accommodative lag.

Reference to any prior art in the specification is not, and should not be taken as, an acknowledgment or any form of suggestion that this prior art forms part of the common general knowledge in any jurisdiction or that this prior art could reasonably be expected to be ascertained, understood and regarded as relevant by a person skilled in the art.

SUMMARY OF THE INVENTION

Viewed generally, embodiments of the invention relate to the surprising discovery that lenses with refractive power have enhanced ability to affect the progression of myopia if the lenses also have a corneal remodelling effect. This corneal remodelling effect may in some embodiments be broad-area corneal remodelling and in other embodiments may be localised remodelling.

Other embodiments of the invention generally relate to lenses that, in addition to providing broad-area corneal remodelling, also provide one or more localised remodelling effects. Structures for localised remodelling may also be applied to an otherwise traditional orthokeratology lens.

In various different embodiments, remodelling of the cornea may be effected in three ways. Firstly, by the use of existing orthokeratology-type lens that imparts a broad-area flattening of the central cornea. Secondly, the introduction of increased thickness (for treatment of myopia) in an inner zone, to effect localised remodelling of a more defined area of the central cornea. This may enhance the myopia treatment of an orthokeratology lens, or provide localised remodelling (only) to a conventional lens. Thirdly, enhancement of the localised remodelling of the central cornea delivered by the inner zone by the provision of increased thickness (for treatment of myopia) in a second (more peripheral) sub-zone of the outer optic zone.

Through appropriate profiling of its thickness modification, the inner zone may provide concurrently a differential power, which is positive relative to an outer optic zone. In some embodiments this relative positive power is suitable for treatment of accommodative lag. Similarly, appropriate profiling of its thickness increase in the second sub-zone of the outer optic zone may provide concurrently a (third) power positive relative to the outer optic zone. This relative positive power being suitable for re-positioning of peripheral image points forward to closer to, on or in front of the retina. This re-positioning of peripheral image points may also be achieved using normal refractive power variations and thus may be provided in lenses that do not include the above-mentioned thickness modification in the second sub-zone.

The lens may have various power profiles, including a substantially uniform power central zone with a positive differential power relative to the distance vision correcting power or a varying central zone power. The outer optical zones may include a constant power, a ring-like structure and/or a zone for effecting peripheral image treatment.

Methods of providing a lens for an eye may be iterative, so as to reflect the intuitive and/or empirical exercise of providing a lens for an eye with a corneal remodelling function. Both the size and extent of thickness variations and the power profile of the lens may be used as variables to work towards an acceptable or optimum lens.

For eyes with hyperopia, the lens may also provide a combination of a powered lens with corneal reshaping, to correct the hyperopia. Generally, the broad-area corneal reshaping will steepen the corneal profile when treating hyperopia and the localised thickness variations will be areas of lesser thickness instead of areas of increased thickness.

Further general aspects of the invention and further embodiments of the aspects described in the preceding paragraphs will become apparent from the following description and/or from the accompanying figures.

As used herein, except where the context requires otherwise, the term "comprise" and variations of the term, such as "comprising", "comprises" and "comprised", are not intended to exclude further additives, components, integers or steps.

DETAILED DESCRIPTION OF THE EMBODIMENTS

For the purposes of explanation, the present description has focussed on lenses for myopic eyes. The invention may have particular application to this field. In general, a myopic eye requires negative power, optionally with one or more regions of relatively positive power, for example to account for lag of accommodation and/or to implement peripheral image control. Conventional corneal remodelling to correct myopia, using for example rigid gas permeable (RGP) lenses, will tend to flatten the cornea. This flattening is applied to a wide extent (broad area) of the central cornea.

With a hyperopic eye the lens will have positive power, optionally with one or more regions of relatively negative power to implement peripheral image control. Corneal remodelling that has an objective of correcting hyperopia will tend to steepen the centre of the cornea. Embodiments of the invention may also have application to hyperopic eyes.

1. Introduction: Methods of Corneal Remodelling

Corneal remodelling is recognised as a viable method to correct refractive error and has been widely applied, particularly using rigid contact lenses. More recently it has been identified that soft contact lenses, such as silicone hydrogel lenses can also effect corneal remodelling. This is described, for example in international patent publication WO 2008/014544 A1, the content of which is incorporated herein in its entirety.

The exact mechanism by which corneal contact lenses cause corneal remodelling is the subject of ongoing research, but the resulting shape of the cornea after use of the lens may be a function of variations in contact lens thickness, posterior surface relative curvature, lid influence, material properties such as the modulus of elasticity of the lens and/or the original shape of the cornea. Accordingly, selection of an appropriate lens to achieve a desired corneal remodelling may be an intuitive and/or empirical exercise. An objective of corneal remodelling when used in the context of the present invention is to flatten the central region to move images backwards or steepen the central region to move images forwards and the selection process will take account of these objectives.

2. Lenses with both a Power and Corneal Remodelling Effect

Embodiments of the invention generally relate to the correction of refractive error of an eye using a lens with a power that also remodels the cornea. The combined effects of the power of the lens and the remodelling function of the lens may provide advantages over known conventional refractive error correction lenses and conventional orthokeratology lenses.

Figure 4:
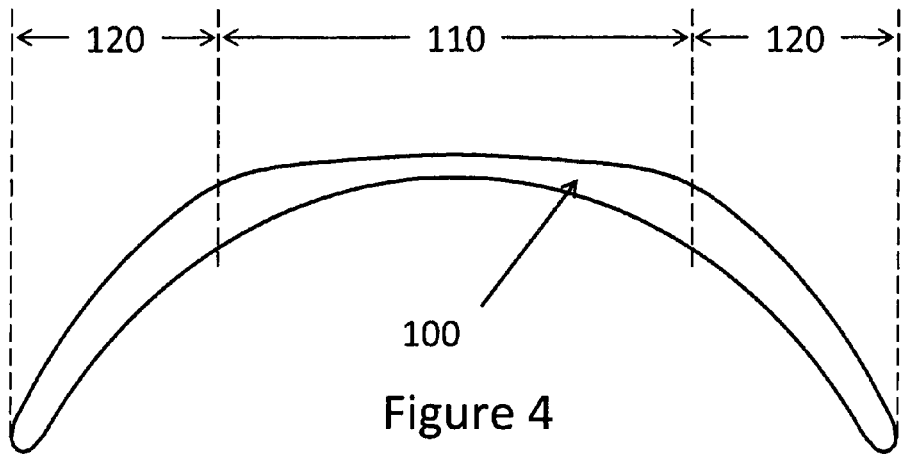
FIG. 4: diagrammatically shows an embodiment of a contact lens, including a refractive power and corneal modelling.

In FIG. 4, a contact lens 100 of the present invention is shown illustrating its cross-section thickness profile. The contact lens 100 is an orthokeratology contact lens, designed with thicknesses and back surface shape intended to apply broad-area remodelling of the cornea. The contact lens 100 is a rigid contact lens, for example an RGP lens. An optic zone 110 provides the appropriate refractive power to correct distance vision while the lens is being worn. The peripheral zone 120 of contact lens 100 acts in similar manners to the periphery of conventional or orthokeratology contact lenses—i.e. to blend the thickness from the optic zone to the edge in a way that maximises comfort and stability of vision.

In other embodiments, the lens 100 is a soft contact lens, for example a silicone hydrogel lens designed to apply broad-area remodelling of the cornea. The silicone hydrogel lens may for example, be an everted lens as described in incorporated international patent publication WO 2008/014544 A1. In these embodiments, the optic zone 110 also provides the appropriate refractive power to correct distance vision.

The peripheral zone 120 is shaped to rest, in the case of a soft contact lens on the sclera, and in the case of a rigid gas permeable or hard lens, on the peripheral cornea, of the eye and acts to locate and retain the contact lens 100 in place. When the contact lens 100 is a hard or rigid gas permeable contact lens, the peripheral zone 120 may be reduced in size.

In still other embodiments, the power profile of the lens 100 is selected to provide a multifocal lens with an area of increased power centrally. Accordingly, different embodiments of the lens 100 have any one of the power profiles described herein below.

3. Lenses with Central Localised Remodelling

Embodiments of lens have an optic zone with a refractive power selected to correct distance vision and have central localised corneal remodelling. In these embodiments, the localised remodelling may be added to an otherwise conventional (non-orthokeratology) contact lens—i.e. a contact lens that, without localised remodelling features, does not produce corneal remodelling effect. In such a case, the localised remodelling may provide the only remodelling effect to the cornea.

Other embodiments of lens are in the form of an orthokeratology lens, designed to apply broad-area remodelling of the cornea by flattening the cornea, and which includes an additional localised central remodelling function.

These embodiments with central localised remodelling may be particularly suited to implementation as soft contact lenses, including for example silicone hydrogel lenses, as a) these materials allow for transfer of forces from the eye-lids to the corneal surface to be modulated by appropriate selection of lens thickness and material properties such as modulus of elasticity and b) provide for increased wearer comfort, given that the lenses may be worn while the patient is awake. However, in other implementations corneal reshaping hard contact lenses may also be provided with the characteristics described herein below.

Figure 5:
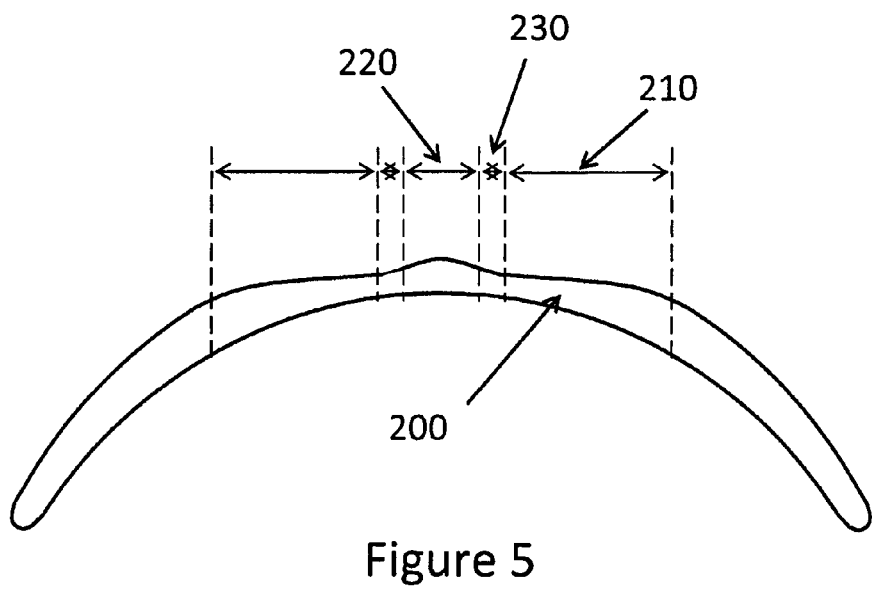
FIG. 5: diagrammatically shows another embodiment of a contact lens, including a central zone of increased thickness.

FIG. 5 is an illustration of the cross-section thickness profile of a contact lens 200 comprising an (outer) optic zone 210 with refractive power and/or broad-area corneal remodelling effect for correcting distance vision and an inner zone 220 of increased thickness for effecting (in the case of a conventional contact lens) or enhancing (in the case of an orthokeratology contact lens) localised remodelling of the central cornea for reducing myopia. FIG. 5 is accordingly representative of three different categories of lens:

1 A conventional (non-orthokeratology) contact lens with an added inner zone of increased thickness;
2 An orthokeratology contact lens designed to provide broad-area reshaping of the cornea and additional remodelling by the inner zone; and
3 An orthokeratology contact lens designed to provide broad-area reshaping of the cornea and additional remodelling by the inner zone and which has an (outer) optic zone with a refractive power for correcting distance vision.

The outer optic zone 210 provides the appropriate correction for distance vision in the wearer. The inner zone 220 provides (for the treatment of myopia) an increased thickness that effects localised remodelling of the central cornea to reduce myopia. The junction between the inner zone 220 and outer optic zone 210 may be joined in a smooth manner (i.e. blended) by the provision of a transition zone 230.

In all embodiments represented by FIG. 5 the thickness of the inner zone 220 is relatively greater than that of the outer optic zone 210. The thickness is selected to provide the required amount of localised remodelling of the central cornea, in order to reduce myopia. Since the forces imparted on the cornea depends on the variation in thickness, the thickness of the inner zone 220 is best expressed as a percentage of the 'projected' central thickness of the outer optic zone 210. This projected central thickness is the thickness the lens 200 would have due to the outer optic zone (i.e. extrapolating the shape of the outer optic zone to the lens centre) if the inner zone 220 is not present. The thickness of the inner zone 220 may be selected from the range of about 105% (i.e. 5% thicker) of projected central thickness of the outer optic zone to about 200% of projected central thickness of the outer optic zone. However, it is expected that for many patients, an appropriate inner zone thickness will be selected from within the range of 105% to 150% or from within the range of 110% to 120%. In some embodiments, the thickness may be below a maximum of 110%, or below a maximum of 120%.

In some embodiments, the thickness of the inner zone 220 may be profiled so as to concurrently provide an optical power which is relatively more positive (an ADD power) than the distance correction power provided by outer optic zone 210. Providing such an ADD power is useful for treating accommodative lag. In various embodiments the ADD power of the inner zone 220 is selected from within a range of approximately 0.5D and 4.00D. For example, if the outer optic zone 210 had a power of −1.50D, then the inner zone may have a power from about −1.00D to +2.50D. In some embodiments, the ADD power may be about 1.25D or in the range of about 0.5D to 2.75D, which may be suitable to substantially reduce or to eliminate lag of accommodation. The ADD power may be substantially constant or may vary across the inner zone. In other embodiments, the inner zone thickness profile is selected to result in an ADD power substantially more than that required to correct lag of accommodation, for example greater than 2.75 D.

Figure 6:
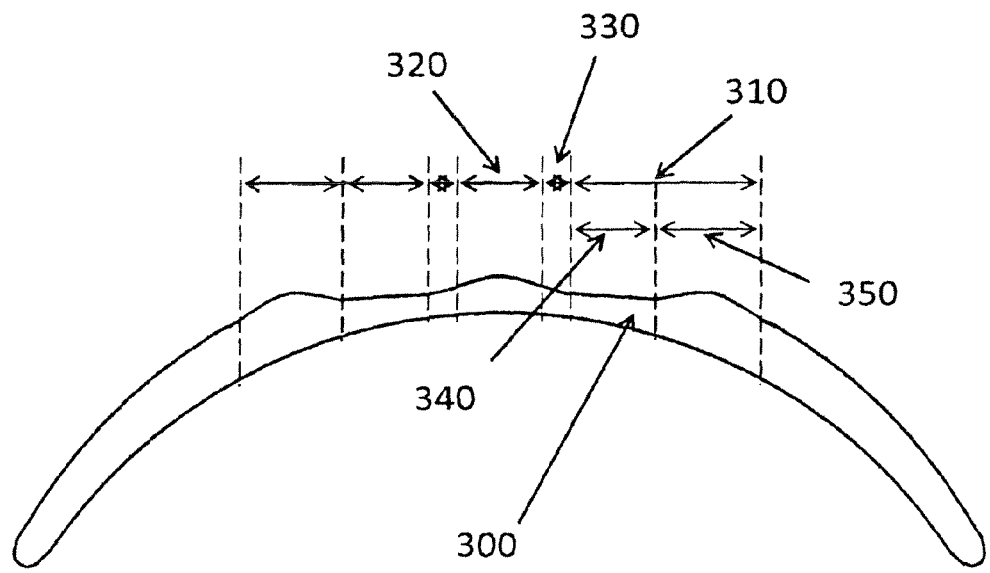
FIG. 6: diagrammatically shows another embodiment of a contact lens, including a mid-peripheral zone of increased thickness.

FIG. 6 is an illustration of the cross-section thickness profile of a contact lens 300 for correcting distance vision through providing refractive power and/or through broad-area corneal remodelling, for effecting localised remodelling of the central cornea for reducing myopia, and for applying increased pressure (from lid forces) to the mid-peripheral cornea. Like the lens shown in FIG. 5, FIG. 6 represents three categories of lenses, representing lenses with and without broad-area corneal reshaping and lenses with both broad-area corneal reshaping and refractive power.

The contact lens 300 comprises an outer optic zone 310 and an inner zone 320. The inner zone 320 provides (for the treatment of myopia) an increased thickness that effects localised remodelling of the central cornea to reduce myopia. The extent of increased thickness was described herein above with reference to FIG. 5. The junction between the inner zone 320 and outer optic zone 310 may be blended by the provision of a transition zone 330. The outer optic zone 310 is further divided into an inner sub-zone 340 and an outer sub-zone 350. In certain embodiments, the inner sub-zone 340 provides the appropriate refractive power to correct distance vision in the wearer, either alone or in combination with a certain extent of corneal remodelling.

The outer sub-zone 350 provides (for treatment of myopia) an increased thickness. This increased thickness facilitates and enhances the localised remodelling of the central cornea effected by the inner zone 320. Like the inner zones 220, 320, the increased thickness of the outer sub-zone 350 may be expressed as a percentage of the 'projected' central thickness of the outer optic zone 310. This projected central thickness is the thickness the lens 300 would have due to the outer optic zone (i.e. extrapolating the shape of the outer optic zone to the lens mid-periphery) if the outer sub-zone 350 is not present. The point of maximum thickness of the outer sub-zone 350 may be about 105% (i.e. 5% thicker) of the projected maximum thickness to about 250% of projected maximum thickness. It is expected that for many patients, an appropriate thickness will be selected from within the range of 105% to 200% or from within the range of 110% to 200%. In some embodiments the maximum thickness of the inner zone 320 and the outer sub-zone 350 are the same. In other embodiments they are different.

In some embodiments of the lens the thickness of the inner zone 320 may be profiled so as to concurrently provide an optical power which is relatively more positive (an ADD power) than the distance correction power provided by the inner sub-zone 340 of the outer optic zone 310. The selection of the ADD power may be made with reference to lag of accommodation or may be greater than that required to treat lag of accommodation, as described above with reference to the embodiments illustrated in FIG. 5.

In some embodiments, the thickness of the outer sub-zone 350 is profiled so as to concurrently provide an optical power which is relatively more positive (an ADD power) than the distance correction power provided by outer optic zone 310. Such a positive power can reposition the peripheral image points to closer to, on or in front of the retina. This ADD power may be used to control the focal position of peripheral images (images received at sufficiently large field angles that they are received by the retina outside of the fovea), with an objective of affecting the progression of myopia, as described in incorporated international patent publication WO 2005/055891 A1. For example, the control over the focal position of peripheral images may be present at field angles of 25 degrees and more.

The lenses shown in FIGS. 5 and 6 also include a peripheral zone, which serves the same or similar function to the peripheral zone 120 described above with reference to FIG. 4.

Figure 7:
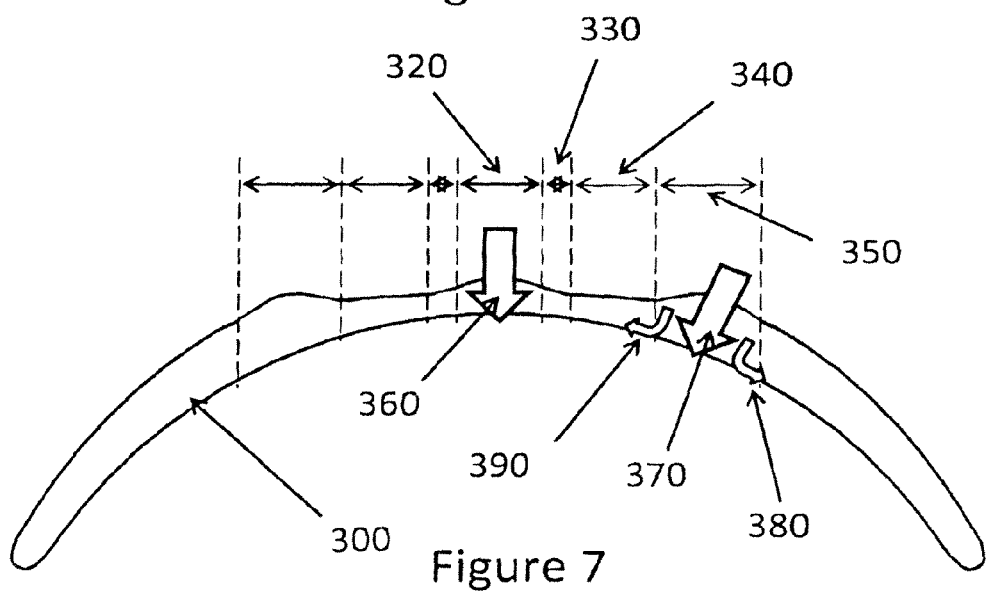
FIG. 7: shows an effect of the eye-lid on the lens of FIG. 6.

FIG. 7 shows the contact lens 300 of FIG. 6 and illustrates a possible mechanism for how localised remodelling of the central cornea may be effected by the inner zone 320 and facilitated by the outer sub-zone 350. As explained, the exact mechanisms by which corneal remodelling are effected is a subject of ongoing research and therefore the description of this mechanism is not intended to be limiting in the event that other mechanisms are at work with the lenses described herein. During the closed-eye or blink phase, the eye-lid applies a dynamic force onto the contact lens 300. This force is perpendicular to the surface of the contact lens. This lid force is transmitted through the contact lens 300 to the cornea and provides pressures on the cornea surface that effect corneal remodelling. The amount of pressures on the cornea depends on variables including the lid force, the material properties (e.g. Young's modulus) and thickness of the contact lens 300.

With a soft contact lens, a locally thicker cross-section will result in greater localised remodelling pressures on the cornea immediately below the location of greater thickness. In the contact lens 300, the inner zone 320 has an increase thickness. This introduces a localised pressure 360 on a defined area at the centre of the cornea. Hence, the remodelling effect is localised to the central cornea. If the contact lens 300 is of the conventional type (i.e. not intrinsically intended to effect corneal remodelling), then the inner zone 320 will provide localised flattening of the central cornea to partially or wholly reduce myopia. If the contact lens 300 is of the orthokeratology type, then the provision of the inner zone 320 will further enhance myopia reduction through enhancement of central corneal flattening.

When eye-lid forces are applied to a peripheral location, such as the outer sub-zone 350 of contact lens 300, localised remodelling pressure 370 is introduced to the mid-periphery of the cornea. However, due to dissipating (i.e. spreading) of the pressure 370, radial components of forces 380 and 390 also results. In the region more peripheral to the outer sub-zone 350, the radial force component is outwards (centrifugal) 380, while in the region more central to the outer sub-zone 350, the radial force component is inwards (centripetal) 390. This centripetal force 390 serves to 'push' and relax the central corneal region which in turn facilitates the remodelling of the central cornea by the localised pressure 360 produced by the inner zone 320.

4. Lens Power Profile

Figure 8:
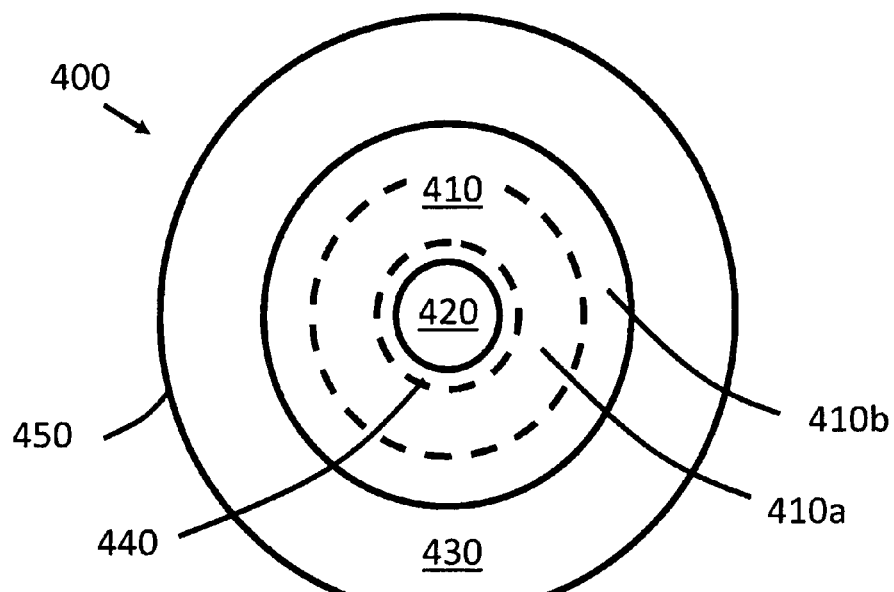
FIG. 8: shows a plan view of an embodiment of a contact lens, including various optic zones.

FIG. 8 shows a plan view of an embodiment of a contact lens 400. The contact lens 400 may be any of the lenses 100, 200, 300 described above with reference to FIGS. 4 to 7.

The lens 400 includes three zones and a transition zone. The three zones are an outer optic zone 410, an inner optic zone 420 and a peripheral zone 430. A transition zone 440 is located between the inner optic zone 420 and the outer optic zone 410. All zones are within the lens's outer peripheral edge 450. The inner optic zone 420 generally coincides in location, shape and dimensions with the inner zone 220 and 320 in FIGS. 5 and 6, but is now described with reference to its optical characteristics instead of its corneal remodelling characteristics. Similarly, the outer optic zone 410 generally coincides in location, shape and dimensions with the outer zones 210 and 310 in FIGS. 5 and 6. In some embodiments, the power profile of the outer optic zone 410 varies. In some embodiments, the outer optic zone 410 includes a sub-zone 410a and a sub-zone 410b. The sub-zone 410b, when provided, generally coincides in location, shape and dimensions with the outer sub-zone 350 in FIG. 6.

Figure 9:
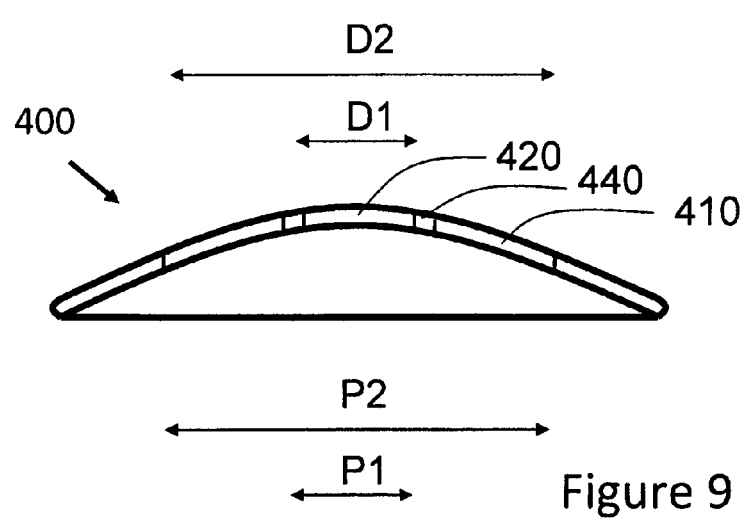
FIG. 9: shows a cross-sectional view through the lens shown in FIG. 8.

FIG. 9 shows a cross-section through the diameter of the lens 400. It will be appreciated that the variations in thickness described with reference to the lenses 200 and 300 will normally be in the range of 2 to 100 microns, the earlier figures exaggerated the change in thickness for the purposes of illustration.

In the embodiment shown the lens 400 is rotationally symmetric. Manufacture of rotationally symmetric lenses may be simpler than asymmetric lenses. However, as explained below, some embodiments of lens are asymmetrical. The lens 400 includes an anterior surface 460 and a posterior surface 470.

The diameter D1 of the inner optic zone 420 approximates or is less than the pupil diameter P1 during viewing at near distances at normal indoor lighting conditions. P1 is typically between 2 and 4 mm, depending on the recipient of the lens. The near distance may correspond to the distance where there is more than negligible or insubstantial lag of accommodation. The inner optic zone 420 may be about 10% of P1, up to about 100% of P1. However, it is expected that for many patients, an appropriate diameter D1 of the inner optic zone 420 will be selected from within the range of 50% to 100% of P1, so that for an eye with P1 of 3 mm, then D1 will be between 1.5 mm and 3.0 mm.

The outer optic zone 410 is annular, with an inner diameter equal to D1 (when both zones are measured from a mid point in the transition zone 440 and an outer diameter D2. The outer diameter D2 at least approximates the pupil diameter P2 during viewing at distant objects at normal indoor lighting conditions. P2 is typically between 3 and 8 mm, depending on the patient. In other embodiments the outer optic zone 410 is larger than P2.

In embodiments where the outer optic zone 410 provides refractive power, the refractive power is chosen having regard to the myopic condition of the eye to which the contact lens 400 is to be applied. In many embodiments the refractive power will be chosen to give the eye substantially clear distance vision. In some embodiments, the outer optic zone 410 has a substantially constant power with increasing radius. As explained below, in other embodiments the outer optic zone 410 may include a plurality of sub-zones with different thicknesses and powers. In these other embodiments, a substantial proportion of the outer optic zone 410 is still allocated to correcting distance vision of the myopic patient, for example at least 50% of the area of the outer optic zone 410, or in other embodiments about 70% or more of the area of the outer optic zone 410.

Figure 10:
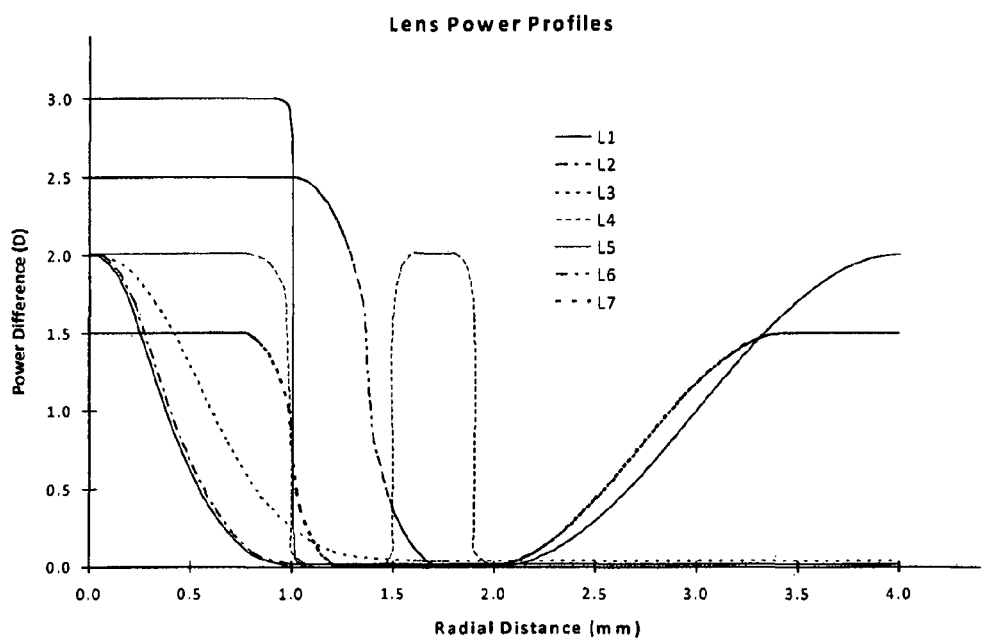
FIG. 10: shows a plot of relative power against radius for several embodiments of lens.

FIG. 10 shows a graph illustrating examples of possible power profiles across the inner optic zone 420 and the outer optic zone 410, plotted against the radius of the lens. The graph has been drawn to show the power differential of the lens relative to the power required to correct the distance vision of a myopic patient. In FIG. 10, the relative power difference is plotted on the vertical axis with the unit of power in dioptres (D) and the radial distance from the lens axis (or simply radius) is plotted on the horizontal axis in millimetres. FIG. 10 shows the profiles of seven different multizone power profiles L1-L7, where:

- L1 Has an inner optic zone 420 with a differential power (ADD power) over the power for distance vision of a maximum of 2D that peaks at the centre (radius 0 mm). The outer optic zone 410 may be viewed as commencing anywhere between a radius of about 0.5 to 1.0 mm; the two zones combine to form a continuous and relatively smooth power profile. The outer optic zone 410 includes two sub-zones: an inner sub-zone 410a having a substantially constant power selected to correct distance vision; and an outer sub-zone 410b with variable (increasing) positive power differential, commencing at about a radius of about 2.25 mm. This embodiment of power profile may be usefully combined with the lens shown in FIG. 6. In such a lens, the outer sub-zone 410b generally coincides in location, size and shape with the outer sub-zone 350 shown in FIG. 6. However, the lens structure shown in FIG. 5 may also be provided with the power profile L1.
- L2 Has a similar power differential profile to L1, except the outer optic zone 410 is entirely dedicated to correcting distance vision. In other words, the inner optic zone 420 has an on-axis ADD power of 2D, which ramps down to the required distance power over the central radius of 1.0 mm and then remains at the distance power. This embodiment of power profile may be usefully combined with a lens having a structure described with reference to FIG. 5. The power profile L2 may also be provided with the lens structure shown in FIG. 6, in which case the thickened outer sub-zone 350 may result in a modification from the flat power profile. This modification from a flat power profile may be minimised by optical design.
- L3 Has a similar power differential profile to L2, but with a larger diameter inner optic zone 420 and a slower rate of change across the inner zone 420. At a radius of 1.0 mm the lens still has an ADD power of about 0.3D. The increased area of the inner optic zone 420 may correspond to an increased area of inner zone 220 or inner zone 320.
- L4 Has an alternative near and distance 'ring' structure, including a positive power inner optic zone 420 of ADD power of about 2D. The outer optic zone 410 commences at a radius of about 1 mm. The outer optic zone 410 includes 3 sub-zones: a ring at the power to correct distance vision; a positive power ring of 2D more positive power than the power required to correct distance vision between a radius of 1.5 mm to about 1.9 mm; and then another ring to correct distance vision. In other embodiments more rings may be provided, alternating between the power for distance correction and a relative positive power. Each ring of relative positive power may have the same power as each other ring, or the power of the rings may differ. The positive power ring profile L4 may assist in dealing with misalignment of the pupil centre with the lens centre, by providing additional power in its second sub-zone of the outer optic zone. Like L2, L4 may be particularly suited to implementation on a lens having the structure described with reference to FIG. 5.
- L5 Has an inner optic zone 420 of substantially constant power and which is about 2.0 mm in diameter. A narrow transition zone 440 is provided to an outer optic zone 410 and the differential power between the zones is 3D. The outer optic zone 410 has substantially constant power at the required power to correct distance vision. L5 may be particularly suited to provision on a lens with the structure described with reference to FIG. 5.
- L6 Has a larger diameter inner optic zone 420 and a transition zone 440 located generally between a radius of 1.0 mm and 1.75 mm. The outer optic zone 410 has a constant power with radius. L5 may be particularly suited to provision on a lens with the structure described with reference to FIG. 5.
- L7 Has an inner optic zone 420 with relatively constant ADD power of about 1.5D. The inner zone diameter is about 2 mm (1 mm radial distance from axis). The outer optic zone 410 is divided into an inner sub-zone 410a between about 1 mm and 2 mm radial distance and an outer sub-zone 410b beginning at about 2 mm radius. The inner sub-zone 410a provides a constant power for correction of distance refractive error while the outer sub-zone 410b repositions the peripheral image points forward by providing increasing (up to +1.5D) peripheral power. L7 may be particularly suited to provision on a lens with the structure described with reference to FIG. 6. However, like lens L1 the lens structure described with reference to FIG. 5 may also be used and designed to have the power profile of L7.

Different combinations of lenses may be formed, for example by combining the power profile L1 or L7 with one of the power profiles L4 to L6 to control the position of peripheral images.

As explained, in some embodiments, the contact lens is designed to provide a peripheral treatment profile, for example relative curvature of field. This may move image points at the peripheral retina closer to, on, or in front of the retina for myopia. The use of a contact lens to control the relative curvature of field to this end is described in incorporated international patent publication WO 05/055891 A1. Embodiments of contact lens may therefore perform the functions of both:

1 correcting myopia through a combination of corneal remodelling and one or more appropriately powered regions, or through a combination of broad-area and localised corneal remodelling, the combination of these mechanisms of correction selected to achieve a desired overall correction; and
2 moving images at the peripheral retina forwards for myopic patients to provide peripheral image treatment.

Embodiments of lens therefore take both these functions into account. For hyperopia, the power profile is reversed, to move image points at the peripheral retina or closer to, on, or behind the retina.

Example power profiles suitable for this purpose are L1 and L7 in FIG. 10. The 'ring' design lens L4 represented in FIG. 10 may also provide a peripheral treatment profile for myopia. In this lens the ring commencing at a radius of 1.5 mm acts to shift images at the peripheral retina forwards. In other embodiments, several rings may be present, each of which move images at the peripheral retina onto or in front of the retina. The rings may be constant width or alternatively may change in width, for example with the outer rings being wider than the inner rings. The rings may have a constant power across their width, as shown, or have a varying power, for example to effect a peripheral treatment profile across their width in the form of curvature of field control.

The relative positive power subzones of the outer optic zone 2 may have the objective of image control at the peripheral retina and be independent from the power required to clearly view near objects. Where there are two or more relative positive power subzones, an inner positive power subzone may have a power that takes account of near object vision requirements and an outer subzone may have a power designed with reference to image control at the peripheral retina, for instance by having a power differential higher than that required to correct the lag of accommodation of the eye.

The location and shape of the relatively positive power sub-zones may be selected to avoid any image priority zones that are in or extend into the outer optic zone 2. The combination of image priority zones with peripheral image aberration is described in international patent publication WO 2007/082268 A2, the content of which is incorporated herein it its entirety.

3 Prescribing a Powered Lens with Corneal Remodelling

Further embodiments of the invention generally relate to methods of prescribing contact lenses. The methods take into account the combined corneal reshaping effects of lenses of the type described above with an objective of providing a more optimum lens.

To prescribe a contact lens that both has a corrective power and which effects corneal remodelling, and taking into account the currently empirical approaches to achieving a required corneal remodelling, a practitioner may approach this in two stages. In general in the first stage:
1. Identify the myopic correction required: this will set the power of the contact lens;
2. Prescribe a lens expected to remodel the cornea by flattening the central part of the cornea.

Following a treatment period, this first lens will likely overcorrect the myopia, due to the combined effect of the outer optic zone and the result of an extent of corneal remodelling. In the second stage:
3. Evaluate the vision of the patient after several days, for example after 10 days, so as to give time for the corneal remodelling to stabilise and then identify the new (reduced) myopic correction required with the corneal remodelling.
4. Prescribe a second lens with the adjusted power profile.

In most cases it is expected that the change in remodelling properties between the first and second lenses will be minor (the lenses should, to the full extent possible while effecting the required change in power profile have the same characteristics). Accordingly, the second lens should provide clear vision. However, if required one or more further iterations of the second stage may be completed.

A practitioner may estimate the refractive effect of corneal remodelling and incorporate that into the design of the first lens prescribed in stage 1. Stage 2 may then either verify that the estimate has resulted in an acceptable lens or proceed as before, but a reduced level of change required would be anticipated, which may result in improved accuracy.

If the contact lens is a multizone lens designed for myopia as described herein above with reference to FIG. 5 and FIG. 10, the process may comprise:

First stage:
1. Identify the myopic correction required: this will set the power of the outer optic zone 410 of the lens, either as a refractive power or as an expected overall flattening of the cornea from an orthokeratology lens;
2. Determine the increased thickness required to effect localised remodelling of the central cornea to effect or enhance central corneal flattening: this will determine the thickness of the inner zone 220 or inner zone 320;
3. If the outer sub-zone 350 is provided, determine the increased thickness required to impart remodelling forces via the mid-periphery of the cornea to effect or enhance central corneal flattening: this will determine the thickness of the outer sub-zone 350.
4. Optionally, determine the thickness profile required to concurrently produce a positive power that focuses the rays from a near object to an image point closer to, on, or in front of the retina (i.e. reduce or eliminate accommodative lag): this, in combination with step 2 will determine the power of the inner zone 420 and may affect the thickness and thickness profile of the inner zone 220 or inner zone 320 (which as explained generally coincides with the inner zone 420);
5. Optionally, determine the thickness profile required to concurrently produce a positive power that focuses peripheral retinal images to provide a required peripheral image treatment profile, for example relative curvature of field: this, in combination with step 3 will determine the power of the outer optic zone 410 and may affect the thickness and thickness profile of the outer sub-zone 350 (which as explained generally coincides with the outer optic zone 410);
6. Prescribe a lens with the power and thickness profile identified in steps 1 and 2 or in steps 1 to 3, either alone or in combination with one or both of steps 4 and 5. This lens will be expected to remodel the cornea by flattening the central part of the cornea and provide a first power for vision correction and (optionally) a second power for treating accommodative lag.

Second stage:
7. Evaluate the vision of the patient after several days, for example after 10 days, so as to give time for the corneal remodelling to stabilise;
   A) Identify the new (reduced) myopic correction required with the corneal remodelling,
   B) Optionally, identify the new thickness, thickness profile and power required to deliver the appropriate amount of localised remodelling to the central cornea and focus the rays from a near object to an image point closer to, on, or in front of the retina;
8. Prescribe a second lens with the adjusted thickness and power profile.

Of course, if the lens prescribed at the end of the first stage is acceptable, then the second stage may be omitted. Alternatively, there may be a number of iterations in which the practitioner and wearer of the lens try to find an acceptable or optimum lens.

There are a substantial number of variables available that can be changed alone or in combinations of two or more variables with the objective of arriving at an acceptable or optimum lens for a wearer.

For example, the proportion of plus power to distance correcting zones can be adjusted by adjusting any one or combination of the variables: the size of the inner zone 220 or inner zone 320 and size of the inner optic zone 420; the extent of variation in thickness of the inner zone 220 or inner zone 320; the extent of variation in thickness of the outer sub-zone 350; the power profile of the inner optic zone 420 (e.g. whether it has substantially uniform power across its radius, whether the power changes); the power profile of the outer optic zone 410; and the width of the transition zone 440.

In some embodiments approximately 40% to 50% of the entire field of vision is allocated to correcting distance vision. In other embodiments approximately 50% to 60% is allocated to correcting distance vision. In other embodiments at least 70% is allocated to correcting distance vision. In some embodiments, a method of prescribing a lens includes providing a lens of any of the types above having an ADD power centrally and/or in the outer zone of the lens, evaluating the distance vision of the wearer and changing the relative proportion of area occupied by distance vision correction zones and relative ADD power zones to reach or get closer to a required proportion of plus power zones, while maintaining acceptable distance vision. The required proportion may be the maximum that still maintains acceptable distance vision.

For example, the method may include commencing with a lens with an inner zone 220 or 230 and inner optical zone 420 of diameter D1 substantially equal to the pupil diameter P1 when the patient is viewing near objects in normal indoor light conditions and a diameter D2 substantially equal to or greater than the pupil diameter P2 when the patient is viewing distant objects. The distance vision of the patient may then be evaluated. If the distance vision is acceptable, the proportion of plus power may optionally be increased, by increasing the diameter of the inner zone and/or providing a plus power sub-zone in the outer optic zone. The distance vision of the patient may then be re-evaluated and the proportion adjusted if necessary. This process of increasing the proportion of plus power with acceptable distance vision (which may include patient acceptance) as a criteria for limiting the proportion may be adopted, for example, if the patient's myopia is progressing past a certain level. For example, the process may be adopted if the patient is progressing more than 0.5D per year or more than 0.7D or 0.8D per year. If the distance vision is not acceptable, the diameter of the inner zone may be decreased and/or any plus power zone in the outer optic zone decreased in size or removed.

6. Rotationally Symmetric and Asymmetric Embodiments

Figure 1:
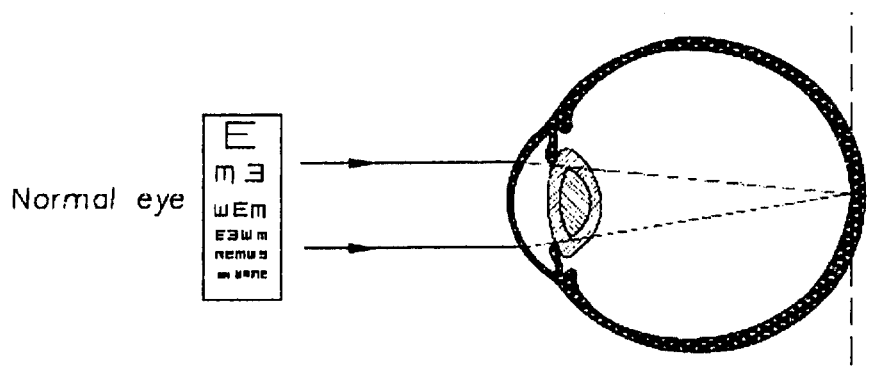
FIG. 1: shows an eye that is normal sighted (emmetropic).
Figure 2:
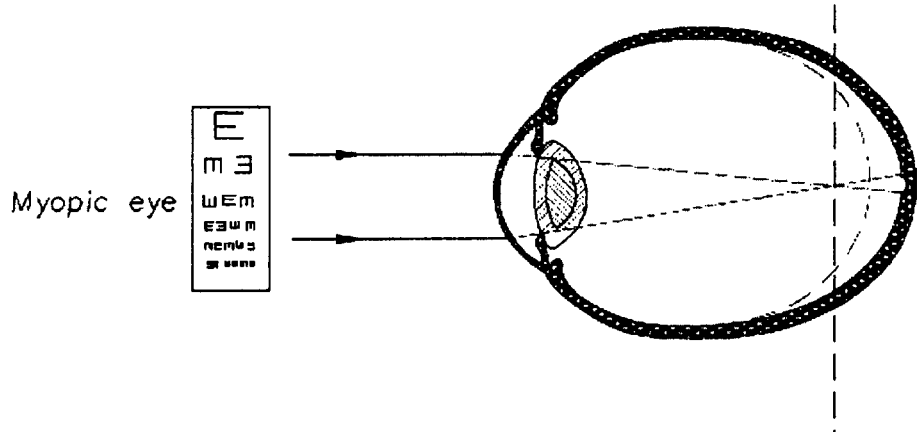
FIG. 2: shows a myopic eye viewing a distant object.
Figure 3:
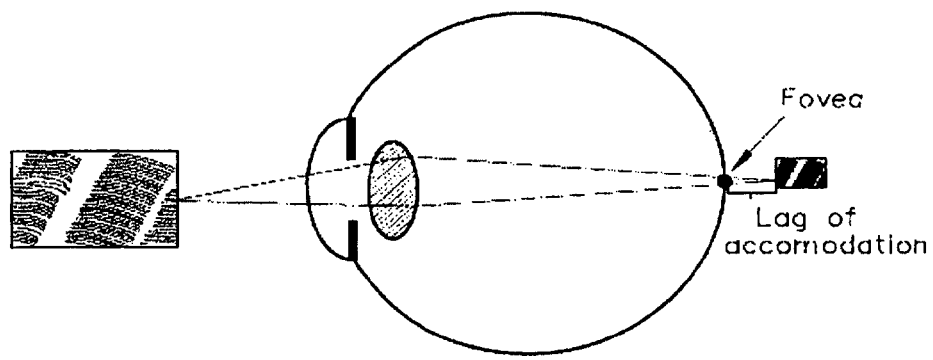
FIG. 3: shows a myopic eye with lag of accommodation.
Figure 11:
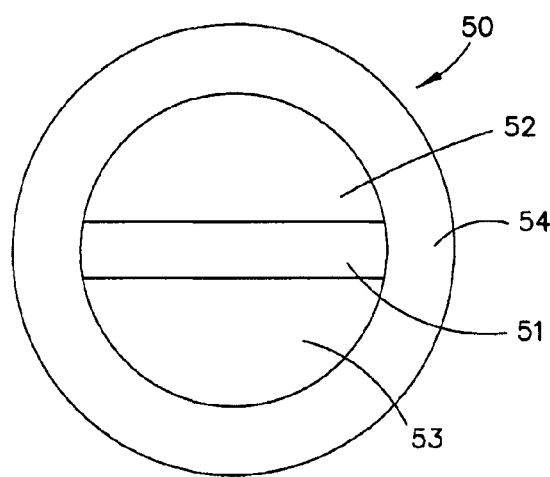
FIG. 11: shows a plan view of an embodiment of a contact lens including a rotationally asymmetric power profile.

While the foregoing description has focussed on rotationally symmetric lenses, other lens configurations may be used. For example, instead of a generally circular inner optical zone 420 (viewed from along the central/optic axis of the lens), the inner optical zone 420 may be a meridian extending across the lens. The meridian may be 0.5 to 3 mm wide, matching the diameter of the inner optical zone 420 described previously. The meridian may terminate at the peripheral zone 120. In this embodiment, the outer optical zone 410 would be two meridians, one on each side of the inner zone 1. FIG. 11 shows the general structure of a lens 50 of this configuration with a meridian inner optic zone 51, a first meridian outer optic zone 52, a second meridian outer optic zone 53 and a peripheral zone 54. As with the lens structure shown in FIGS. 3 and 4, the peripheral zone 54 may be omitted for a hard contact lens or corneal on-lay. The power profile along a vertical half-meridian (with reference to the orientation of the lens 50 shown in FIG. 11) may be any of the profiles described above with reference to FIG. 10. The thickness profile of the lens is still largely rotationally symmetric, except for variations necessary to achieve the optical characteristics of the lens. The profile is therefore substantially as described above with reference to FIG. 5 or FIG. 6.

If a lens is ballasted or otherwise formed to orient on the eye and remains in position when the eye moves, then the inner optical zone 420 and the inner zone 220 or inner zone 330 may be located off-centre. This location may reflect the inward movement (towards the nose) of the pupil when viewing near objects. This movement may be about 0.5 mm.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A contact lens for treating an eye with myopia, the contact lens having an optic zone comprising an area having a refractive first power, which corrects distance vision of the eye, and
    comprising a structural profile to effect flattening remodelling of the cornea of the eye when the contact lens is fitted to the eye;
    wherein the contact lens comprises a central zone and an outer zone surrounding the central zone, wherein the central zone has an increased thickness relative to the outer zone, the increased thickness providing at least part of said structural profile to effect flattening remodelling of the cornea; and
    wherein the optic zone comprises a central optic zone, the central optic zone having a differential refractive power, which is positive relative to the first refractive power.

2. The contact lens of claim 1, wherein at least a portion of the central zone has a thickness of at least 105% of the projected central thickness of the outer zone if the shape of the outer zone were extrapolated to the centre of the lens.

3. The contact lens of claim 2, wherein the central zone has a maximum thickness of 120% of the projected central thickness of the outer zone if the shape of the outer zone were extrapolated to the centre of the lens.

4. The contact lens of claim 1, wherein at least a portion of the central zone has a thickness of at least 110% of the projected central thickness of the outer zone if the shape of the outer zone were extrapolated to the centre of the lens.

5. The contact lens of claim 1, wherein the differential refractive power is between 0.5D and 4.0D or between 1.0D and 4.0D or between 1.5D and 4.0D.

6. The contact lens of claim 1, wherein the contact lens comprises a central zone, a first outer sub-zone surrounding the central zone and a second outer sub-zone surrounding the first outer sub-zone, wherein the central zone has an increased thickness relative the first outer sub-zone, the increased thickness providing part of said structural profile to effect remodelling of the cornea and wherein the second outer sub-zone has an increased thickness relative to the first outer sub-zone, providing another part of said structural profile to effect remodelling of the cornea.

7. The contact lens of claim 6, wherein the second outer sub-zone has an increased thickness relative to a projected maximum central thickness if the shape of the first outer sub-zone were extrapolated across the second outer sub-zone, of at least 105%, or at least 110%, or at least 120%, or at least 150%.

8. The contact lens of claim 7, wherein at least a portion of the central zone has a thickness relative to a projected central thickness of the first outer sub-zone if the shape of the first outer sub-zone were extrapolated to the centre of the lens of at least 105%, or at least 110%.

9. The contact lens of claim 6, wherein at least a portion of the central zone has a thickness relative to a projected central thickness of the first outer sub-zone if the shape of the first outer sub-zone were extrapolated to the centre of the lens of at least 105%, or at least 110%.

10. The contact lens of claim 6, wherein the optic zone comprises a central optic zone, the central optic zone having a differential refractive power, which is positive relative to the first refractive power, and wherein the differential refractive power is between 0.5D and 4.0D or between 1.0D and 4.0D or between 1.5D and 4.0D.

11. The contact lens of claim 10, wherein optic zone comprises an outer optic sub-zone, separated from the central optic zone by the area having the first refractive power, the outer optic sub-zone having a differential refractive power, which is positive relative to the first refractive power.

12. The contact lens of claim 11, wherein the differential refractive power increases with increasing radius so as to provide relative curvature of field for images of objects at field angles where the image is received by the retina outside of the fovea of the eye.

13. The contact lens of claim 12, wherein the outer optic sub-zone is surrounded on its outer peripheral sides by a second area having the first refractive power.

14. The contact lens of claim 11, wherein the outer optic sub-zone is surrounded on its outer peripheral sides by a second area having the first refractive power.

15. The contact lens of claim 1, wherein the contact lens has a structural profile to remodel the cornea by flattening the corneal profile over a broad area of the cornea.

16. A method of treating a myopic eye, the method comprising providing the eye with a contact lens as defined in claim 1.

17. A contact lens for treating an eye with myopia, the contact lens comprising:
   an optic zone comprising an area having a first refractive power, which corrects distance vision of the eye, and
   a central zone and an outer zone surrounding the central zone, wherein at least a portion of the central zone has a thickness of at least 105% of the projected central thickness of the outer zone if the shape of the outer zone were extrapolated to the centre of the lens;
   wherein the area having a first refractive power surrounds said central zone; and
   wherein the contact lens comprises a central optical zone, located, shaped and dimensioned approximately the same as said central zone, the central optical zone having a relatively positive refractive power in comparison to said first refractive power.

18. The contact lens of claim 17, wherein the central zone has a thickness in the range of 110% and 120% of the projected central thickness of the outer zone if the shape of the outer zone were extrapolated to the centre of the lens.

19. The contact lens of claim 17, wherein the central zone has a thickness of greater than 120% of the projected central thickness of the outer zone if the shape of the outer zone were extrapolated to the centre of the lens.

20. The contact lens of claim 17, wherein the contact lens comprises a central zone, a first outer sub-zone surrounding the central zone and a second outer-sub-zone surrounding the first outer sub-zone, wherein the central zone has an increased thickness relative an extrapolated thickness of the first outer sub-zone to the centre of the lens and wherein the second outer sub-zone has an increased thickness relative to the an extrapolated thickness of the first outer sub-zone into the second outer sub-zone.

21. The contact lens of claim 17, wherein the relatively positive refractive power is between 0.5D and 4.0D.

22. The contact lens of claim 17, wherein the contact lens comprises an outer optical sub-zone, surrounding the area having the first power, the outer optical sub-zone having a relatively positive power in comparison to the first power.

* * * * *